United States Patent
Freeman et al.

(10) Patent No.: US 10,612,402 B2
(45) Date of Patent: Apr. 7, 2020

(54) METHOD OF ASSEMBLY OF BI-CAST TURBINE VANE

(71) Applicants: Rolls-Royce Corporation, Indianapolis, IN (US); Rolls-Royce North American Technologies Inc., Indianapolis, IN (US)

(72) Inventors: Ted J. Freeman, Danville, IN (US); Robert F. Proctor, Carmel, IN (US); Sean E. Landwehr, Avon, IN (US); Adam L. Chamberlain, Mooresville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 211 days.

(21) Appl. No.: 15/711,567

(22) Filed: Sep. 21, 2017

(65) Prior Publication Data
US 2018/0030840 A1 Feb. 1, 2018

Related U.S. Application Data

(63) Continuation of application No. 14/144,939, filed on Dec. 31, 2013, now Pat. No. 9,803,486.
(Continued)

(51) Int. Cl.
*F01D 9/02* (2006.01)
*B23P 15/00* (2006.01)
(Continued)

(52) U.S. Cl.
CPC ............... *F01D 9/02* (2013.01); *B23P 15/04* (2013.01); *C04B 37/005* (2013.01); *F01D 5/189* (2013.01);
(Continued)

(58) Field of Classification Search
CPC .......... F05D 2300/211; F05D 2260/20; F05D 2300/6033; F05D 2230/21; F05D 2230/60;
(Continued)

(56) References Cited

U.S. PATENT DOCUMENTS

| 3,910,716 A | 10/1975 | Roughgarden et al. |
| 5,269,057 A | 12/1993 | Mendham et al. |

(Continued)

FOREIGN PATENT DOCUMENTS

| DE | 10346240 A1 | 4/2005 |
| EP | 1367037 A2 | 12/2003 |

(Continued)

OTHER PUBLICATIONS

Written Opinion, International Application No. PCT/US2013/078425, dated Sep. 14, 2015, 7 pages.
(Continued)

*Primary Examiner* — Sarang Afzali
(74) *Attorney, Agent, or Firm* — Barnes & Thornburg LLP

(57) ABSTRACT

One aspect of the present disclosure includes a turbine vane assembly comprising a vane made from ceramic matrix composite material having an outer wall extending between a leading edge and a trailing edge and between a first end and an opposing second end; an endwall made at least partially from a ceramic matrix composite material configured to engage the first end of the vane; and a retaining region including corresponding bi-cast grooves formed adjacent the first end of the vane and a receiving aperture formed in the endwall; wherein a bond is formed in the retaining region to join the vane and endwall together.

18 Claims, 7 Drawing Sheets

Related U.S. Application Data

(60) Provisional application No. 61/786,291, filed on Mar. 14, 2013.

(51) Int. Cl.

| | | |
|---|---|---|
| *C04B 37/00* | (2006.01) | |
| *F01D 5/18* | (2006.01) | |
| *F01D 5/28* | (2006.01) | |
| *F01D 9/04* | (2006.01) | |
| *B23P 15/04* | (2006.01) | |
| *B29C 45/14* | (2006.01) | |

(52) U.S. Cl.
CPC ............ *F01D 5/284* (2013.01); *F01D 5/288* (2013.01); *F01D 9/041* (2013.01); *F01D 9/044* (2013.01); *B23P 15/008* (2013.01); *B29C 2045/1454* (2013.01); *C04B 2237/083* (2013.01); *C04B 2237/365* (2013.01); *C04B 2237/38* (2013.01); *C04B 2237/61* (2013.01); *C04B 2237/76* (2013.01); *C04B 2237/84* (2013.01); *F05D 2260/20* (2013.01); *F05D 2300/211* (2013.01); *F05D 2300/6033* (2013.01); *Y02T 50/672* (2013.01); *Y02T 50/673* (2013.01); *Y02T 50/676* (2013.01); *Y02T 50/6765* (2018.05); *Y10T 29/49321* (2015.01); *Y10T 29/49323* (2015.01); *Y10T 29/49984* (2015.01)

(58) Field of Classification Search
CPC .... F05D 2230/236; F01D 9/041; F01D 5/288; F01D 5/189; F01D 5/284; F01D 9/044; F05B 2230/21; F05B 2230/236; F16L 13/11; F16L 13/116; B29C 45/14467; B29C 2045/1454; B23P 19/04; B23P 15/04; B23P 15/008; C04B 37/005; C04B 2237/76; C04B 2237/365; C04B 2237/38; C04B 2237/84; C04B 2237/083; C04B 2237/61; Y02T 50/672; Y02T 50/673; Y02T 50/676; Y02T 50/6765; Y10T 29/4932; Y10T 29/49321; Y10T 29/49323; Y10T 29/49336; Y10T 29/49337; Y10T 29/49339; Y10T 29/49341; Y10T 29/49343
See application file for complete search history.

(56) References Cited

U.S. PATENT DOCUMENTS

| | | | |
|---|---|---|---|
| 5,332,360 A * | 7/1994 | Correia | F01D 9/042 |
| | | | 29/889.21 |
| 5,601,407 A | 2/1997 | Humhauser | |
| 5,630,700 A * | 5/1997 | Olsen | F01D 5/189 |
| | | | 415/134 |
| 5,797,725 A | 8/1998 | Rhodes et al. | |
| 6,648,597 B1 | 11/2003 | Widrig et al. | |
| 6,670,026 B2 | 12/2003 | Steibel et al. | |
| 8,215,900 B2 | 7/2012 | Morrison | |
| 8,231,354 B2 | 7/2012 | Campbell et al. | |
| 8,242,406 B2 * | 8/2012 | Schreiber | B23K 1/0018 |
| | | | 219/121.64 |
| 8,292,580 B2 * | 10/2012 | Schiavo | F01D 5/189 |
| | | | 416/229 A |
| 8,801,381 B2 | 8/2014 | Simon-Delgado et al. | |
| 8,998,566 B2 | 4/2015 | Justl et al. | |
| 2005/0254942 A1 | 11/2005 | Morrison et al. | |
| 2010/0054930 A1 | 3/2010 | Morrison | |
| 2010/0068034 A1 | 3/2010 | Schiavo et al. | |
| 2010/0166565 A1 | 7/2010 | Uskert et al. | |
| 2011/0142639 A1 | 6/2011 | Campbell et al. | |
| 2012/0009071 A1 | 1/2012 | Tanahashi et al. | |
| 2012/0145316 A1 * | 6/2012 | Miller | B23K 31/02 |
| | | | 156/279 |
| 2012/0156044 A1 | 6/2012 | Ortiz | |

FOREIGN PATENT DOCUMENTS

| | | |
|---|---|---|
| EP | 1852572 A2 | 11/2007 |
| EP | 1930306 A1 | 6/2008 |
| EP | 2412929 A1 | 2/2012 |
| JP | 08226304 A | 9/1996 |
| JP | 2009228606 A | 10/2009 |
| WO | 2010110327 A1 | 9/2010 |

OTHER PUBLICATIONS

International Search Report, International Application No. PCT/US2013/078425, dated Oct. 14, 2014, 13 pages.
European Office Action dated Jun. 7, 2018 and issued in connection with EP Patent Application No. 13871301.1.

* cited by examiner

METHOD OF ASSEMBLY OF BI-CAST TURBINE VANE

CROSS REFERENCE TO RELATED APPLICATIONS

This patent application is a continuation of U.S. patent application Ser. No. 14/144,939, filed Dec. 31, 2013, which claims priority to and the benefit U.S. Provisional Patent Application No. 61/786,291, filed on Mar. 14, 2013, the disclosures of each of which are now expressly incorporated by reference herein, including but not limited to those portions concerning turbine vanes.

TECHNICAL FIELD

The present disclosure generally relates to gas turbine engines, and more particularly, but not exclusively, to bi-cast ceramic matrix composite turbine vanes.

BACKGROUND

Present approaches to design and manufacture of turbine vane assemblies made at least partially from ceramic matrix composite material suffer from a variety of drawbacks, limitations, and disadvantages. There is a need for unique and inventive designs, systems and methods for improved turbine vane assemblies.

SUMMARY

One embodiment of the present disclosure includes a unique turbine vane assembly made at least partially from a ceramic matrix composite material and operable within a gas turbine engine. Other embodiments include methods for constructing and coupling a ceramic matrix composite turbine vane to a pair of inner and outer endwalls to form a turbine vane assembly. Further embodiments, forms, features, aspects, benefits, and advantages of the present disclosure shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF REPRESENTATIVE EMBODIMENTS

Figure 1:
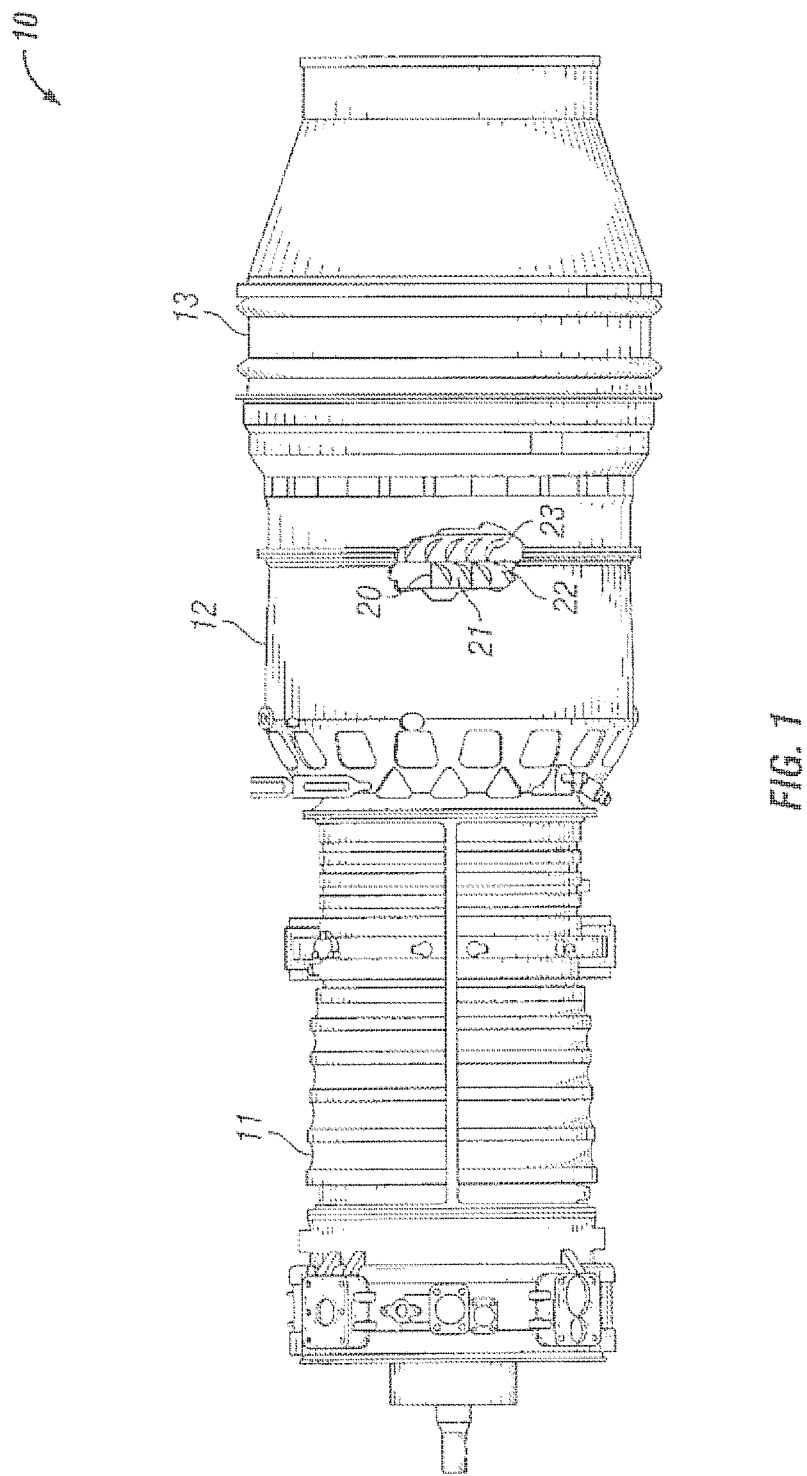
FIG. 1 is a partially fragmented side elevational view of a gas turbine engine comprising a turbine nozzle vane assembly according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrative device, and such further applications of the principles of the invention as illustrated therein being contemplated as would normally occur to one skilled in the art to which the invention relates.

With reference to FIG. 1, there is illustrated a gas turbine engine 10 which includes a compressor 11, a combustor 12 and a turbine 13. The three components have been integrated together to produce an aircraft flight propulsion engine. It is important to realize that there are many ways in which the components can be linked together. Additional compressors and turbines can be added with inner coolers connecting between the compressor and reheat combustion chambers to be added between the turbines. Further, the gas turbine engine is equally suited to be used for industrial applications. Historically there has been wide spread applications of industrial gas turbine engines, such as pumping sets for gas, oil transmission lines, electricity generation and naval propulsion.

A turbine nozzle vane assembly 20 positioned within the gas turbine engine 10 includes a plurality of vane segments 21 that are circumferentially positioned in a flow path for working fluid to flow therethrough. Each of the vane segments 21 has at least one vane 22 coupled thereto for directing the working fluid to a rotor having a plurality of turbine blades 23 for extracting energy therefrom. It should be noted that the term "airfoil" may be used herein interchangeably with the term "vane" or alternatively as a "portion of the vane" or a "portion of the vane assembly."

Figure 2:
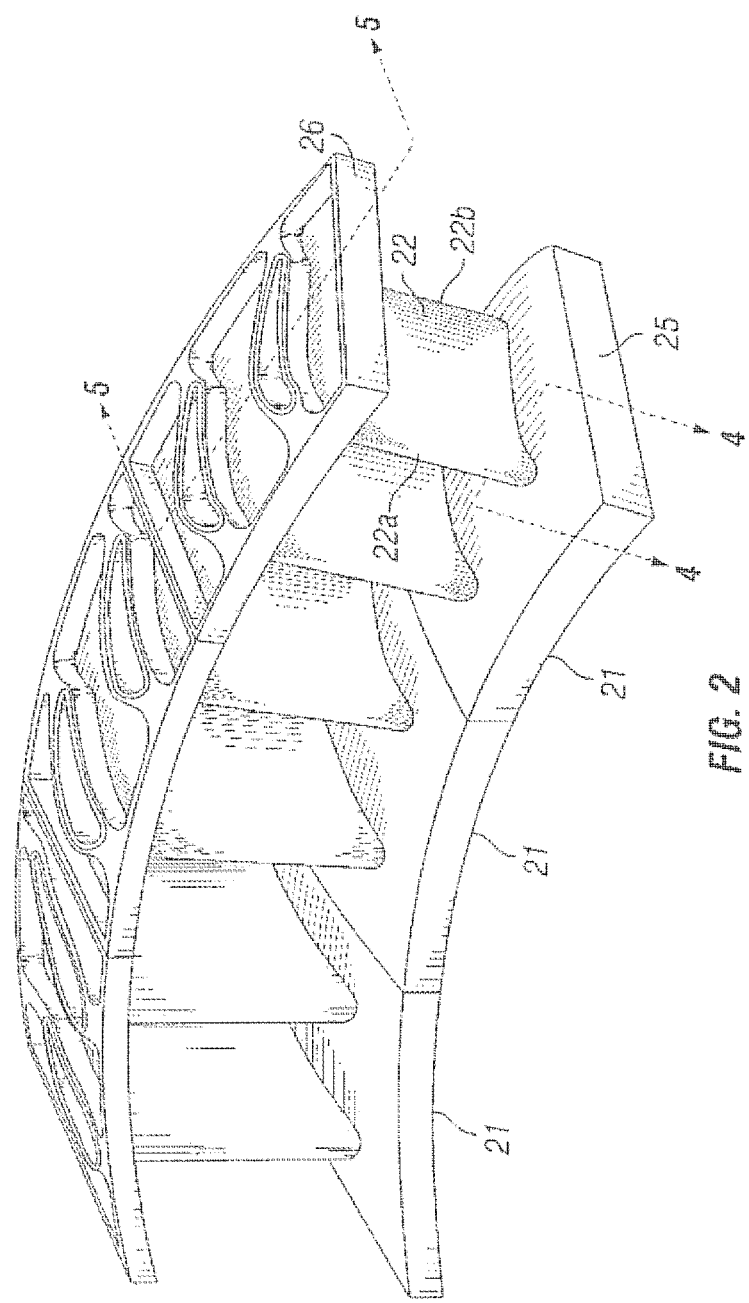
FIG. 2 is a partial perspective view of a plurality of vane segments comprising a portion of the nozzle vane assembly of FIG. 1.

With reference to FIG. 2, there is illustrated a plurality of circumferentially spaced vane segments 21 that form a portion of the turbine nozzle vane assembly 20. The plurality of vane segments 21 are joined together to collectively form a complete 360 degree nozzle ring. Each of the vane segments 21 includes one or more vanes 22 that can be coupled at their first and second ends to inner and outer endwall members 25, 26. In the illustrative embodiment shown in FIG. 2, vane segment 21 has two vanes coupled thereto, however it should be understood that a vane segment may have one or more vanes per vane segment and is not limited to a vane segment having two vanes.

Vane 22 has a leading edge 22a and a trailing edge 22b and an outer surface extending therebetween. The term spanwise will be used herein to indicate an orientation between the first endwall 25 and the second endwall 26. Further, the term streamwise will be used herein to indicate an orientation between the leading edge 22a and the trailing edge 22b.

Figure 3A:
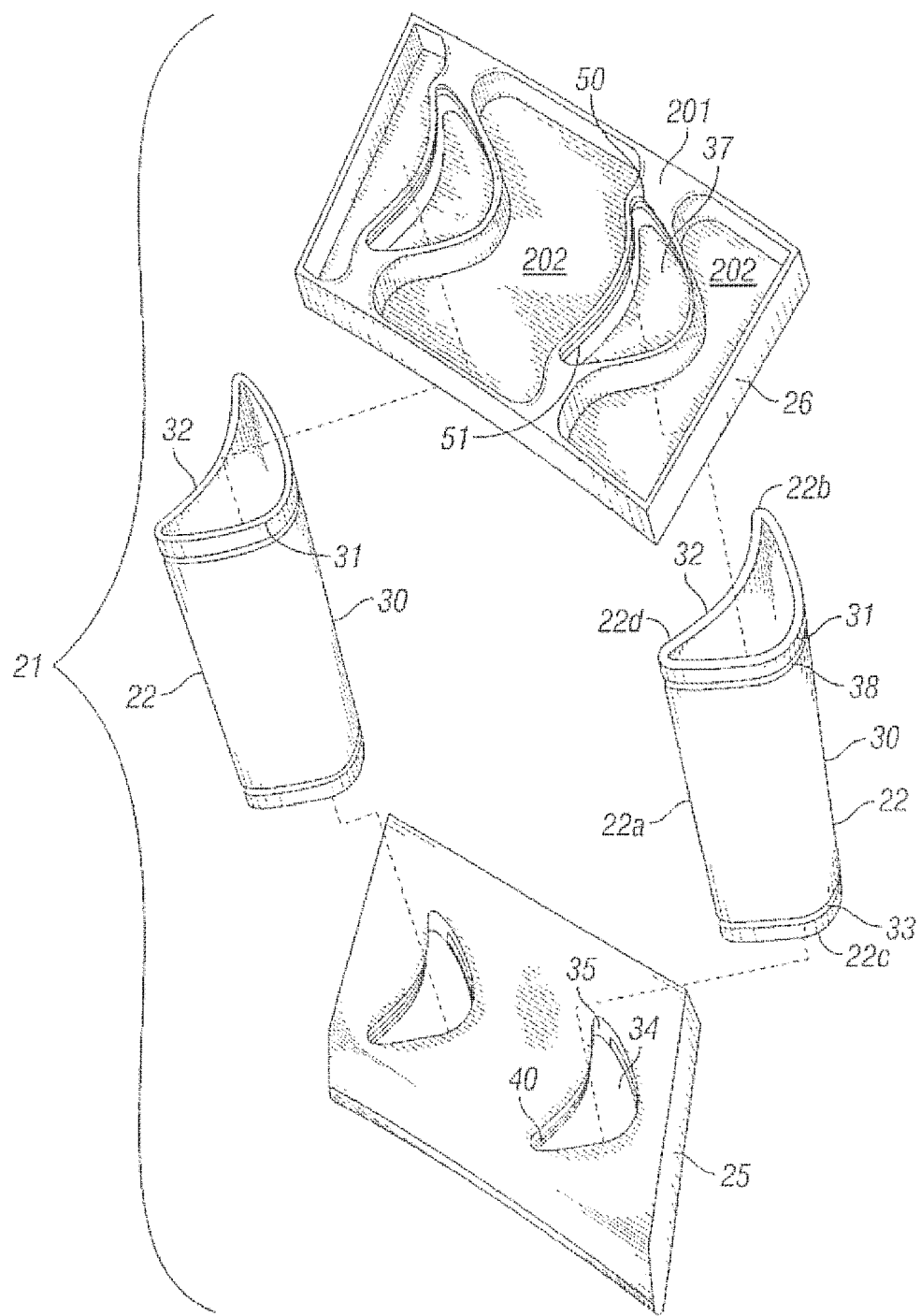
FIG. 3A is an exploded view of a vane segment according to an exemplary embodiment of the present disclosure.

With reference to FIG. 3A, there is illustrated an exploded view of the vane segment 21 which includes a first endwall 25, a second endwall 26 and a pair of vanes 22 that can be coupled to the respective endwalls 25, 26. Each vane 22 defines an airfoil having an outer surface or wall 30 extending between the leading edge 22a and the trailing edge 22b. The leading and trailing edges 22a, 22b of the vane 22 extend between a first end 22c and an opposing second end 22d. The vane 22 is generally conventional with the outer surface 30 having a convex suction side 31 and an opposite concave pressure side 32. In one exemplary embodiment, the first endwall 25, the second endwall 26 and the vanes 22 can be formed from a ceramic matrix composite (CMC) material. In other embodiments, various other materials may be used as desired.

In one form, the vanes 22 and endwalls 25, 26 can be made at least partially from a CMC material and manufactured with conventional CMC fabrication methods such as creating a shaped preform member and subsequently infiltrating the preform with a ceramic matrix material. The vanes 22 and the endwalls 25, 26 can also include other materials including mixtures or combinations of materials such as polymers, metals, inter-metallics, and ceramics.

In general CMC components are made from preforms that are placed into a desired shape from a lay-up of a plurality of fibers. The preform may also be made of filament windings, braiding, and knotting of fibers, as well as two-dimensional and three-dimensional fabrics, unidirectional fabrics, and non-woven textiles. The fibers used in the preform can be made from a number of different materials including, but not limited to ceramic fibers, organic fibers, metallic fibers, and glass fibers. The fibers can be formed from varying cross sectional shapes and sizes. The fibers may be processed with one or more coating layers before being placed in a preform or alternatively after being placed in a preform to promote strength, wear resistance or other desirable characteristics.

The matrix may be made from any number of materials including but not limited to polymers, metals, and/or ceramics, such as silicon carbide, and silicon/silicon carbide and mixtures thereof. The preform may be infiltrated by the matrix by any number of processes including deposition from a gas phase, such as chemical vapor deposition or chemical vapor infiltration, pyrolysis, chemical reaction, sintering, and electrophoresis. Ceramic materials can include compositions or mixtures of alumina, silicon carbide, aluminum nitride, silicon nitride or zirconia, silicon carbide, and silicon/silicon carbide to name but a few examples. After forming a component made from a ceramic matrix composite material, finishing processes such as cleaning, machining, grinding, and coating can be implemented as desired. In one embodiment one or more layers of a thermal barrier coating to reduce heat transfer and/or of an environmental barrier coating to reduce corrosion may be applied to the outer surfaces of the vanes 22 and the endwalls 25, 26.

In one embodiment, the vanes 22 can be formed as a "hollow" CMC structure with only the airfoil outer wall 30 providing structural rigidity to carry operational loads such as aerodynamic fluid forces and other forces from mechanical loading such as those generated by operation of the gas turbine engine. In other embodiments, the vanes 22 can be designed with internal structure that can include complex shapes, openings and passageways therein. The open portions including directed passageways can provide means for connecting with fluid pathways in one or more of the endwalls 25, 26 for providing a path for cooling fluid to traverse therethrough and cool the vanes 22 and the endwalls 25, 26. While not shown in the drawings, it should be understood that outer walls of the vanes 22 and the endwalls 25, 26 may be formed with cooling holes so as to permit cooling fluid to flow therethrough and provide film cooling to hot surfaces positioned in an exhaust stream of the gas turbine engine 10.

In other embodiments, the vane segments 21 including the vanes 22 and endwalls 25, 26 may be made from metallic or intermetallic materials through casting, forging, sheet fabrication and the like. In still further embodiments, the vane segments 21 including the vanes 22 and endwalls 25, 26 may be made from combinations of CMC and metallic materials. In one example, the vane 22 can be a hollow cast structure produced by a casting operation utilizing various super alloy compositions such as mixtures of nickel, chromium, aluminum and cobalt among other select elements.

Regardless of material selection or manufacturing methods, at least one bi-cast groove 33 can be formed proximate the first end 22c of vane 22 and extends along the outer wall 30 of the vane 22. In one form, the bi-cast groove 33 extends completely around the outer wall 30 of the vane 22 along both sides thereof between the leading and trailing edges 22a and 22b. The shape of the bi-cast groove 33 can be rectangular, semicircular or other shape as desired. By way of example and not limitation, the width of the bi-cast groove 33 can be in the range of about 0.050 to 0.100 inches.

The first endwall member 25 can include an aperture 34 formed therein for receiving the first end 22c of the vane 22 therein. The aperture 34 has a sidewall portion 35 which includes at least one complementary bi-cast groove 40 that extends substantially collinear with the bi-cast groove 33 in the first end 22c of the vane. Upon positioning of the first end 22c of the vane 22 within the aperture 34 the corresponding bi-cast grooves 33, 40 are placed in registry. It is understood herein that the grooves in vane 22 and in the first endwall 25 are not necessarily of the same shape and size, however grooves of the same shape and size are contemplated herein. In one embodiment the grooves 33 and 40 extend completely around the perimeters of both the vane 22 and the wall defining the aperture 34.

The second endwall member 26 includes an aperture 37 formed therethrough for receiving an opposing end 22d of the vane 22. In one embodiment reinforcing ribs 201 are formed around the apertures 34 and 37. While the endwall 26 has been shown with material removed from a portion 202, it is understood that endwall members without material removed from portions 202 are contemplated herein. Aperture 37 has a sidewall portion 50 which includes a bi-cast groove 51 that extends substantially colinear with a corresponding bi-cast groove 38 formed in the second end 22d of vane 22. The connection between endwall member 26 and the second end 22d of vane 22 can be substantially similar to the connection between first endwall member 25 and the first end 22c of vane 22. In one form, the bi-cast groove 38 extends completely around the outer wall 30 of the vane 22 and along both sides thereof between the leading and trailing edges 22a and 22b.

In one form of the present disclosure the ends 22c and 22d of the vanes each include at least one bi-cast groove 33 and 38 respectively that extend around a portion of the outer surface 30 of the vane 22. In one exemplary embodiment, the bi-cast grooves 33 and 38 respectively extend between the leading edge 22a along both sides of the vane to a position spaced away from the trailing edge 22b. In another exemplary embodiment, the bi-cast grooves 33 and 38 respectively may terminate without extending entirely around the surface of the vane 22. It should be understood that in this form, the bi-cast groove 33 and 38 do not extend completely around the outer surface 30 of the vane and the absence of the bi-cast groove 33 and 38 in a portion of the vane 22 proximate the trailing edge 22b allows for the movement/floating of the trailing edge portion of the vane relative to the endwall members 25 and 26 in response to thermal conditions. In another form of the present disclosure, the coupling of the ends 22c and 22d of the vane 22 to their respective endwall members 25, 26 is different so that one end is allowed to move/float and the other end is substantially fixed relative to the endwall member.

Figure 3B:
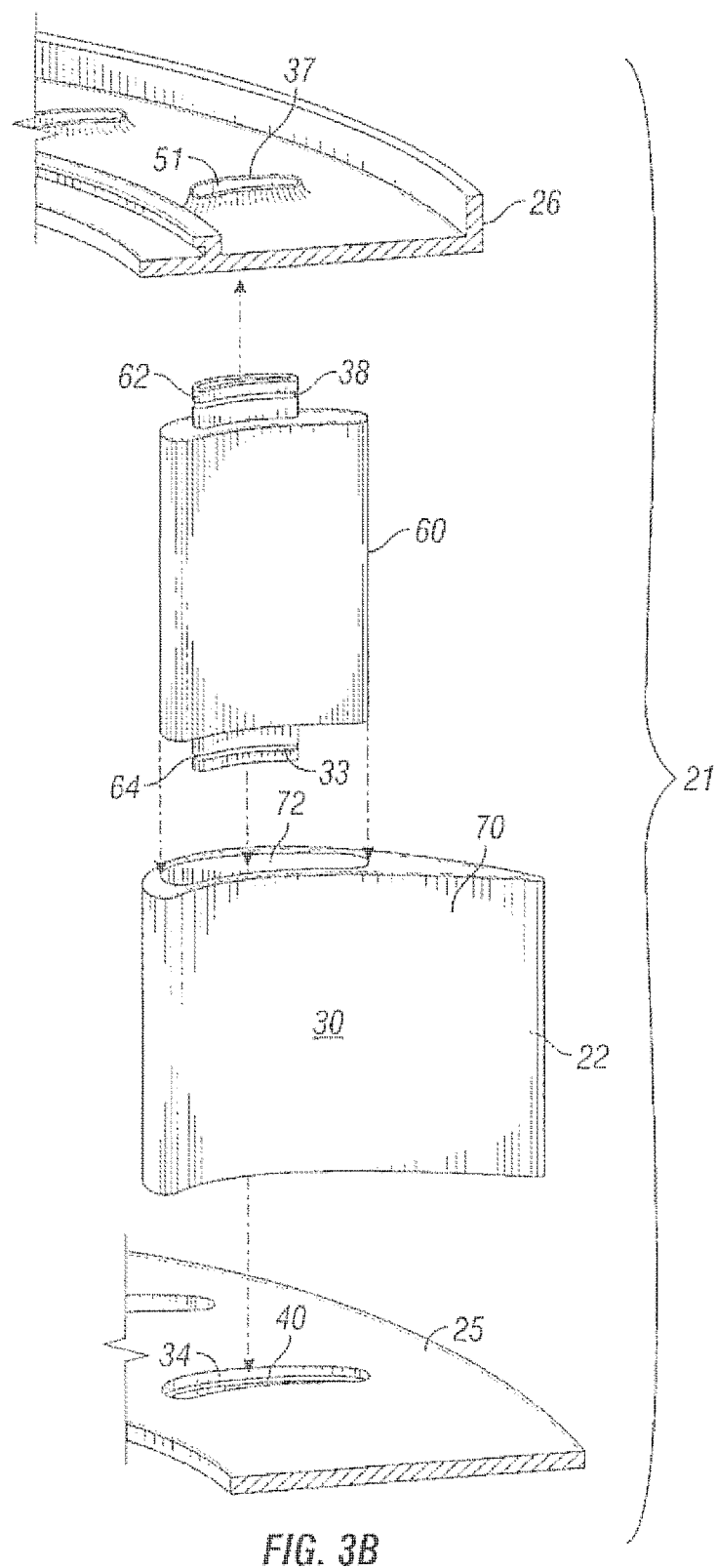
FIG. 3B is an exploded view of a vane segment according to another exemplary embodiment of the present disclosure.

Referring now to FIG. 3B, an alternate embodiment of the vane segment 21 is illustrated. The vane segment 21 of FIG. 3B can be largely similar to the vane segment 21 of FIG. 3A wherein similar features are labeled with similar numerical notation. Only a portion of the features of the vane segment 21 will be described such that an understanding of the differences can be ascertained without detailing previously described features. The vane segment 21 can include an inner spar 60 extending between the inner and outer endwalls 25, 26 to provide structural support for the vane 22. The spar 60 can be formed from a variety of materials including metals and ceramic composites. When the spar 60 is made from a metal material, the endwalls 25, 26 may also be made of a metal material to provide similar coefficients of thermal expansion to minimize thermal induced stress into the spar 60. Alternatively, the material section may not correspond between the spar 60 and the endwalls 25,26. For example the spar 60 may be made of a metal material while the endwalls 25, 26 may be made of a ceramic based material or vice versa. In yet another form, all three components, the spar 60 and both endwalls 25, 26 can be formed from a ceramic matrix composite material.

A pair of protruding connectors or extensions 62, 64 extends from either end of the spar 60 to engage with apertures 37 and 34 of the first and second endwalls 25, 26 respectively. Similar to previous embodiments, corresponding bi-cast grooves 38 and 51 at one end of the spar 60 and corresponding bi-cast grooves 33 and 40 at the other end of the spar 60 can form vane retaining regions as will be described in detail below.

An airfoil shaped sleeve 70 can be slidingly engaged with the spar 60 so as to form the airfoil shaped outer wall 30 of the vane 22. The sleeve 70 is preferably made from a ceramic matrix composite, but other materials such as metals and inter-metallic compounds are contemplated herein. A slot 72 can be formed in the sleeve 70 so as to substantially conform with the shape of the spar 60. The spar 60 can slidingly engage the sleeve 70 though the slot 72 and connect to the two endwalls through the extensions 62, 64. The slot 72 and the spar 60 can be shaped in such a way as to prevent rotational movement of the sleeve 70 about the spar 60. In one form, the slot shape may be formed in any desirable non-circular shape such as an ovalized or a rectangular shape. If a desired shape is circular then the sleeve 70 would necessarily have to be mechanically joined to the spar 60 to prevent rotation during operation. Mechanical bonding means can include processes such as welding, brazing, chemical bonding and the like. The airfoil sleeve 70 need not be mechanically joined to the spar 60 in some embodiments, as the sleeve will be trapped between the two endwalls 25, 26 and cannot pivot or rotate about the spar 60 when formed with a noncircular slot 72. The sleeve 70 may be configured to permit some movement relative to the spar 60 and the endwalls 25, 26 such that thermal expansion mismatch between the spar 60 and endwalls 25, 26 will not cause deflection induced stress in the airfoil shaped sleeve 70.

Figure 4A:
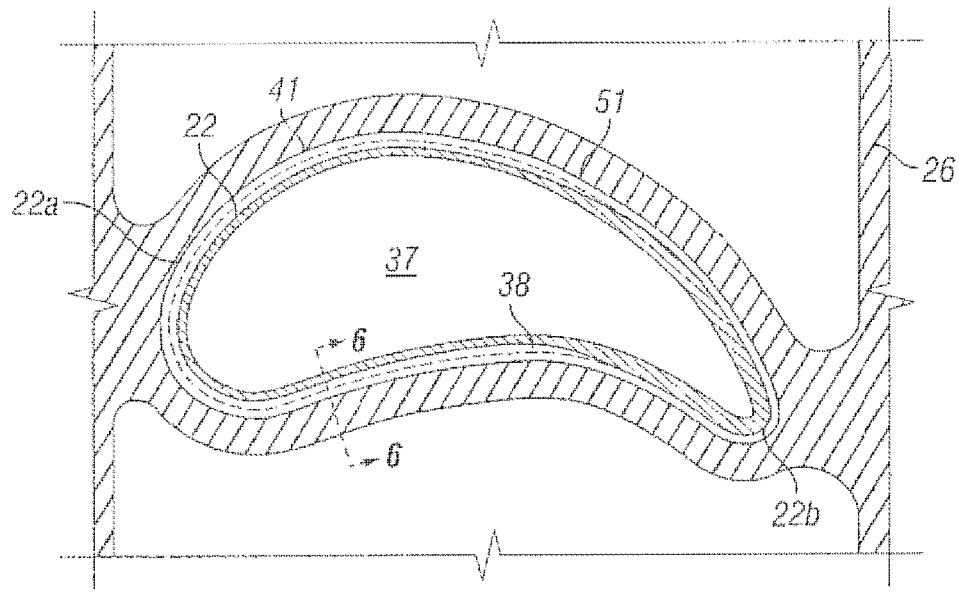
FIG. 4A is a sectional view of a retaining region of the vane segment shown in FIG. 3A.

With reference to FIG. 4A, a cross sectional view of the connection between the vane 22 and each end wall 25, 26 taken along line 4-4 of FIG. 2 is shown. A retaining region 41 can be formed insitu proximate the bi-cast grooves 33, 38 formed in the vanes 22 and the bi-cast grooves 40, 51 formed in the endwalls 25, 26. The section view in FIG. 4A depicts the upper endwall 26, but the lower endwall 25 can be retained through a bi-cast process in a similar manner. The retaining region 41 is configured to secure the vanes 22 to endwalls 25, 26.

For embodiments wherein both the vanes 22 and the endwalls 25, 26 are formed from CMC material, various means can be employed such that the retaining region can be configured to join CMC vanes 22 to CMC endwalls 25, 25. In one example, a Silicon alloy with temperature depressant can be injected into the retaining region 41 as a powder or liquid and solidified to form a fixed connection. In another form, polymer infiltration and pyrolysis (PIP) can be used as means for connecting the vanes 22 to the endwalls 25, 26. PIP is a multi-step process wherein a pre-cursor is injected into the retaining region 41 and then pyrolyzed such that the required density and strength are met as known to those skilled in the art. In another form, phenolic char conversion with silicon addition can be utilized such that material in the retaining region 41 is partially burned out leaving carbon residue and a subsequent injection of silicon can form a Silicon Carbide (SiC) bond. In yet another form, the retaining region 41 can be filled with ceramic fiber and a ceramic matrix composite bond can be created through a CVI or CVD process. In yet another form, a urethane foam conversion plus silicon can be used wherein carbon foam can be inserted into the retaining region 41 and a subsequent silicon injection can create a lattice SiC and Si bond between the CMC vane 22 and the endwalls 25, 26. In yet another form, a urethane foam conversion can be used in combination with PIP process to create a bond between the vane 22 and the endwalls 25, 26.

Figure 4B:
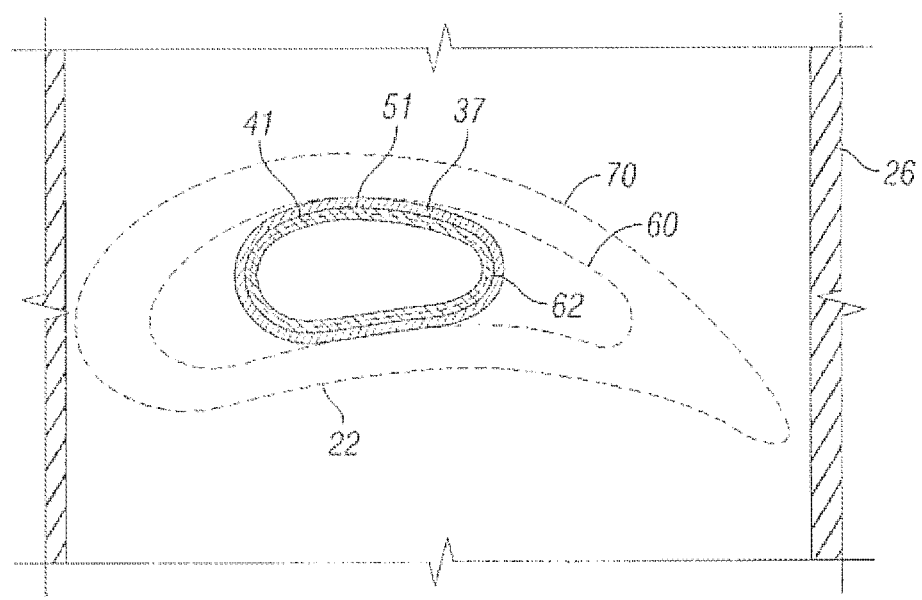
FIG. 4B is a sectional view of a retaining region of the vane segment shown in FIG. 3B.

With reference to FIG. 4B, there is shown a cross sectional view of the connection region between the opposing extensions 62, 68 of the spar 60 and corresponding endwalls 25, 26 taken along line 4-4 of FIG. 2 for the embodiment illustrated in FIG. 3B. The spar 60 can be joined to the endwalls 25, 26 via the retaining region 41 as described above for embodiments wherein the spar 60 and the endwalls 25, 26 are made from CMC material. For embodiments wherein the spar 60 and the endwall 25, 26 are made from metallic material other joining methods may be employed at the retaining region 41. For example, a weld or braze may be employed to one or both ends of the spar 60 proximate the retaining region 41 to form a permanent connection between the spar 60 and the endwalls 25, 26. In another form, the retaining region 41 may include a cast or forged retaining member positioned in the grooves 33, 38 of the extensions 62, 64 so as to provide a removable connection between the spar 60 and the endwalls 25, 26. Other joining methods as would be known to those skilled in the art are also contemplated by the present disclosure.

Figure 5:
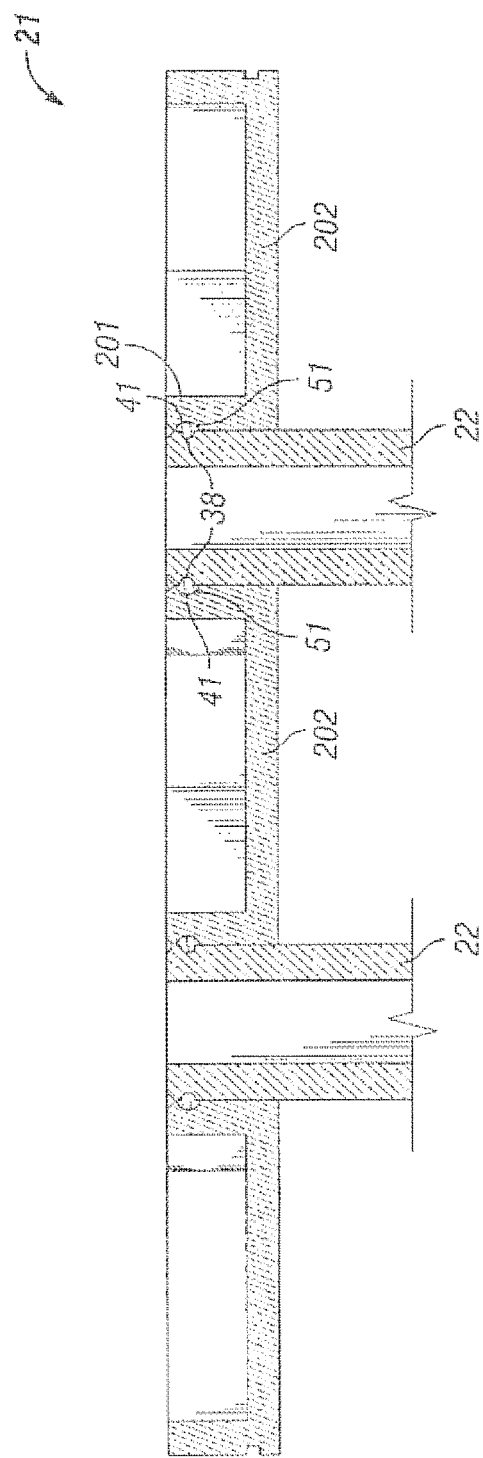
FIG. 5 is a sectional view of FIG. 2 taken along line 5-5.

With reference to FIG. 5, there is illustrated a cross sectional view of the vane segment 21 taken along lines 5-5 of FIG. 2. The vane 22 is positioned within aperture 37. The retaining region 41 including the bi-cast grooves 51 and 38 functions to mechanically couple the endwall member 26 with the vanes 22. The retaining region 41 further functions to provide a substantially fluid tight seal for minimizing and/or preventing the leakage of fluid between the vanes 22 and the side wall 201 of the aperture 37. The retaining region 41 can be substantially similar on the opposing end of the vane 22 with respect to connection with the endwall 25.

Figure 6:
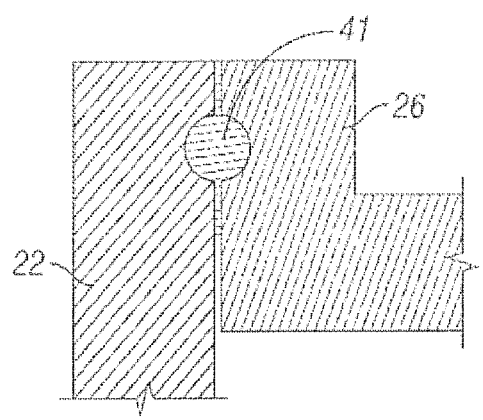
FIG. 6 is an enlarged partial sectional view of the retaining region between an endwall and a vane according one or more embodiments of the present disclosure.

With reference to FIG. 6 there is illustrated an enlarged sectional view of the retaining region 41 utilized to couple the vane 22 with the respective endwalls 25, 26. In this depicted embodiment, the retaining region includes a substantially circular shaped portion, however, It should be understood that the shapes and geometric configurations associated with the retaining region 41 is illustrative and other shapes and geometric configures are contemplated herein.

One aspect of the present disclosure includes a turbine vane assembly comprising a vane made from ceramic matrix composite material having an outer wall extending between a leading edge and a trailing edge and between a first end and an opposing second end; an endwall made at least partially from a ceramic matrix composite material configured to engage the first end of the vane; and a retaining region including corresponding bi-cast grooves formed adjacent the first end of the vane and a receiving aperture formed in the endwall; wherein a bond is formed in the retaining region to join the vane and endwall together.

A second endwall made at least partially from ceramic matrix composite material can be configured to engage the second end of the vane. The vane can include internal open regions for receiving cooling fluid and wherein at least one endwall includes internal open regions fluidly connected to the open regions of the vane. The vane can include a plurality of cooling holes formed through an outer wall in fluid communication with the open regions. One or more layers of a thermal barrier coating and/or an environmental barrier coating can be applied to outer surface of the vane.

Another aspect of the present disclosure includes a gas turbine engine vane, comprising an airfoil having an outer surface extending between a leading edge and a trailing edge and between a first end and an opposing second end, a through slot extending between the first and second ends of the airfoil; and a spar slidingly engageable with the slot of the airfoil.

Another aspect of the present disclosure includes a gas turbine engine comprising a turbine section including at least one rotatable blade stage and at least one nozzle vane stage; the nozzle vane stage including: a pair of endwalls including a plurality of through apertures having at least one bi-cast groove formed therein; a plurality of vanes formed at least partially from a ceramic matrix composite material positioned between the pair of endwalls; and a retaining region formed proximate the bi-cast grooves of the endwall apertures.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of assembling a gas turbine engine vane including an airfoil having an outer surface extending between a leading edge and a trailing edge and between a first end and a second end; a through slot extending between the first and second ends of the airfoil; and a spar slidingly engaged within the slot of the airfoil, the spar including a pair of extensions each with at least one bi-cast groove formed on opposing ends of the spar, wherein the extensions of the spar are configured to engage with corresponding apertures formed in a pair of opposing endwalls, the method comprising:
    inserting at least one of the pair of extensions into one of the corresponding apertures of the pair of opposing end walls,
    injecting a pre-cursor into the at least one bi-cast groove of the at least one of the pair of extensions, and
    heating the pre-cursor to form a fixed connection between the inserted extension of the spar and a circumferential surface defining the corresponding aperture of the corresponding end wall, wherein the fixed connection is formed between a lateral face of the at least one of the pair of extensions and the circumferential surface of the corresponding aperture, the lateral face of the at least one of the pair of extensions formed to face perpendicularly from a length of the at least one of the pair of extensions inserted into the one of the corresponding apertures, wherein the lateral face includes the at least one bi-cast groove and the circumferential surface includes at least one complimentary bi-cast groove.

2. The method of claim 1, further comprising inserting the other one of the pair of extensions into the aperture of the other of the pair of opposing end walls.

3. The method of claim 2, wherein injecting the pre-cursor includes injecting the pre-cursor into the at least one bi-cast groove of each of the pair of extensions.

4. The method of claim 1, wherein, prior to heating to form a fixed connection, the pre-cursor is initially a powder or a liquid.

5. The method of claim 1, wherein a cross sectional shape of the spar corresponds with the cross sectional shape of the through slot and at least one of the pair of extensions protrudes from the through slot.

6. The method of claim 1, wherein heating the pre-cursor including forming a fixed connection between the spar relative to at least one of the endwalls while the airfoil remains slidingly free within the through slot.

7. The method of claim 1, wherein injecting the pre-cursor includes delivering precursor to fill the at least one bi-cast groove.

8. The method of claim 1, wherein the at least one bi-cast groove is part of a retaining region that provides a fluid tight seal for minimizing leakage between the vane and the corresponding one of the pair of opposing end walls.

9. The method of claim 1, wherein at least one of the spar and one of the pair of opposing end walls are formed of ceramic matrix composite material.

10. A method of assembling a gas turbine engine including at least one vane, the at least one vane including an airfoil having an outer surface extending between a leading edge and a trailing edge and between a first end and a second end; a through slot extending between the first and second ends of the airfoil; and a spar slidingly engaged within the slot of the airfoil, the spar including a pair of extensions each with at least one bi-cast groove formed on opposing ends thereof, wherein the extensions of the spar are configured to engage with corresponding apertures formed in a pair of opposing endwalls, the method comprising:
    inserting at least one of the pair of extensions into one of the apertures of the pair of opposing end walls,
    injecting a pre-cursor into the at least one bi-cast groove of the at least one of the pair of extensions, and
    heating the pre-cursor to form a fixed connection between the inserted extension of the spar and a circumferential surface defining the corresponding aperture of the corresponding end wall, wherein the fixed connection is formed between a lateral face of the at least one of the pair of extensions and the circumferential surface of the corresponding aperture, the lateral face of the at least one of the pair of extensions formed to face perpendicularly from a length of the at least one of the pair of extensions inserted into the one of the corresponding apertures, wherein the lateral face includes the at least one bi-cast groove and the circumferential surface includes at least one complimentary bi-cast groove.

11. The method of claim 10, further comprising inserting the other one of the pair of extensions into the aperture of the other of the pair of opposing end walls.

12. The method of claim 11, wherein injecting the pre-cursor includes injecting the pre-cursor into the at least one bi-cast groove of each of the pair of extensions.

13. The method of claim 10, wherein, prior to heating to form a fixed connection, the pre-cursor is initially a powder or a liquid.

14. The method of claim 10, wherein a cross sectional shape of the spar corresponds with the cross sectional shape of the through slot and at least one of the pair of extensions protrudes from the through slot.

15. The method of claim 10, wherein heating the pre-cursor to form a fixed connection between the spar relative to at least one of the endwalls while the airfoil remains slidingly free within the through slot.

16. The method of claim 10, wherein injecting the pre-cursor includes delivering precursor to fill the at least one bi-cast groove.

17. The method of claim 10, wherein the at least one bi-cast groove is part of a retaining region that provides a fluid tight seal for minimizing leakage between the vane and the corresponding one of the pair of opposing end walls.

18. The method of claim 10, wherein at least one of the spar and one of the pair of opposing end walls are formed of ceramic matrix composite material.

* * * * *